(12) United States Patent
Lee et al.

(10) Patent No.: US 9,715,142 B2
(45) Date of Patent: Jul. 25, 2017

(54) DISPLAY DEVICE HAVING AN EDGE LIGHT UNIT

(71) Applicant: KORTEK CORPORATION, Incheon (KR)

(72) Inventors: Gun Ho Lee, Seoul (KR); Yong Hun Park, Incheon (KR)

(73) Assignee: KORTEK CORPORATION (KR)

( * ) Notice: Subject to any disclaimer, the term of this patent is extended or adjusted under 35 U.S.C. 154(b) by 0 days.

(21) Appl. No.: 15/131,642

(22) Filed: Apr. 18, 2016

(65) Prior Publication Data

US 2016/0306229 A1    Oct. 20, 2016

Related U.S. Application Data

(63) Continuation of application No. PCT/KR2014/009515, filed on Oct. 10, 2014.

(30) Foreign Application Priority Data

Nov. 6, 2013   (KR) .................. 10-2013-0134340

(51) Int. Cl.
*F21V 7/04* (2006.01)
*G02F 1/1335* (2006.01)
(Continued)

(52) U.S. Cl.
CPC ...... *G02F 1/133615* (2013.01); *G02F 1/1336* (2013.01); *G02F 1/133308* (2013.01);
(Continued)

(58) Field of Classification Search
CPC ......... G02F 1/133615; G02F 1/133308; G02F 1/133504; G02F 1/133512;
(Continued)

(56) References Cited

U.S. PATENT DOCUMENTS

2005/0046321 A1*   3/2005   Suga ................... G02B 5/0226
                                                               313/112
2005/0270733 A1   12/2005   Lam et al.
(Continued)

FOREIGN PATENT DOCUMENTS

KR         20080064625 A      7/2008
KR         20080109421 A     12/2008
(Continued)

OTHER PUBLICATIONS

Australian Office Action dated May 27, 2016; Patent Application No. 2014347436; 5 pgs.
International Search Report; PCT/KR2014/009515; International Filing Date: Oct. 10; 3 pgs.

*Primary Examiner* — Anh Mai
*Assistant Examiner* — Hana Featherly
(74) *Attorney, Agent, or Firm* — Schmeiser, Olsen & Watts, LLP

(57) ABSTRACT

A display device is provided. The disclosed display device includes: a frame having a display panel; a back surface cover for covering the back surface of the frame; a glass part for covering the front surface of the frame; and an edge light part, included in the frame, for irradiating light to the front surface and the back surface of the edge of the frame.

5 Claims, 5 Drawing Sheets

(51) Int. Cl.
  *H04N 5/64* (2006.01)
  *G02F 1/1333* (2006.01)
(52) U.S. Cl.
  CPC .. *G02F 1/133504* (2013.01); *G02F 1/133512* (2013.01); *G02F 1/133524* (2013.01); *H04N 5/64* (2013.01); *G02F 2001/133314* (2013.01); *G02F 2001/133331* (2013.01)
(58) Field of Classification Search
  CPC ... G02F 1/133524; G02F 2001/133314; G02F 2001/133331; H04N 5/64
  USPC ........................................................ 362/558
  See application file for complete search history.

(56) References Cited

U.S. PATENT DOCUMENTS

| | | |
|---|---|---|
| 2007/0021217 A1 | 1/2007 | Wu |
| 2009/0040748 A1 | 2/2009 | Kerr |
| 2009/0141002 A1 | 6/2009 | Sohn et al. |
| 2010/0277951 A1 | 11/2010 | Kim et al. |
| 2011/0043724 A1 | 2/2011 | Kim |
| 2011/0116258 A1 | 5/2011 | Ma |

FOREIGN PATENT DOCUMENTS

| | | |
|---|---|---|
| KR | 20-2010-0008633 U | 9/2010 |
| KR | 20120012612 A | 2/2012 |
| WO | 0023975 A1 | 4/2000 |

\* cited by examiner

DISPLAY DEVICE HAVING AN EDGE LIGHT UNIT

CROSS-REFERENCE TO RELATED APPLICATIONS

This application is a continuation application to PCT/KR2014/009515, having a filing date of Oct. 10, 2014, based on KR 10 2013 0134340, having a filing date of Nov. 6, 2013, the entire contents of which are hereby incorporated by reference.

FIELD OF TECHNOLOGY

The following relates to a display device, and more particularly, to a display device which includes an edge light unit integrally provided inside a glass portion to create visual effects, thereby improving aesthetics.

BACKGROUND

Recently, keeping pace with the information era, the field of displays has rapidly developed, and, as flat panel display devices (FPDs) having advantages of thin thickness, light weight, and low power consumption, liquid crystal displays (LCDs), plasma display panels (PDPs), electroluminescent displays (ELDs), field emission displays (FEDs), and the like have been introduced and are in the limelight while quickly replacing conventional cathode ray tubes (CRTs).

Heretofore, liquid crystal displays are most widely used in the fields of laptops, monitors, TVs, and the like, by virtue of their advantage in display of moving-pictures and high contrast ratio, and such aliquid crystal displays do not have any self-luminous element and thus require a separate light source.

SUMMARY

Accordingly, a liquid crystal display is provided at a rear side thereof with a backlight unit having a lamp, which emits light toward a front side of a liquid crystal panel, thereby realizing an image having brightness recognizable by the human eye.

As a light source for a backlight unit, cold cathode fluorescent lamps, external electrode fluorescent lamps, light emitting diodes (LEDs), and the like are used.

Thereamong, LEDs have advantages of small size, low power consumption, and high reliability, and are thus widely used as a light source for displays.

In the related art, Korean Patent Publication No. 2012-0012612 (published on Feb. 10, 2012) discloses "Liquid crystal display".

An aspect relates to a display device which includes an edge light unit integrally provided to a frame and irradiating light forwards and backwards to create visual effects forwards and backwards, thereby improving aesthetics while providing a compact structure.

Technical Solution

In accordance with one aspect of embodiments of the present invention, there is provided a display device which includes: a frame provided with a display panel; a rear cover covering a rear side of the frame; a glass portion covering a front side of the frame; and an edge light unit provided to the frame and irradiating light forwardly and backwardly of an edge of the frame.

The edge light unit may include: a light source disposed around the frame; and a light guide bar diffusing and guiding light from the light source to be irradiated forwardly and backwardly of the frame.

The glass portion may be provided at an edge thereof with an anti-glare portion preventing glare of light irradiated through the light guide bar.

The anti-glare portion may include: a white mask disposed on the edge of the glass portion to correspond to a leading end of the light guide bar; and a black mask disposed on one or both sides of the white mask.

A rear end of the light guide bar may project through a through-hole of the frame; and the rear cover may have an open hole through which the rear end of the light guide bar is exposed outwards.

The light guide bar may have an extension interposed between the rear cover and the glass portion to facilitate assembly with the rear cover and the glass portion.

The light guide bar may be provided on a surface thereof with a white reflector.

Advantageous Effects

According to embodiments of the present invention, it is possible to provide a display device which includes a light guide bar integrally provided inside a glass portion and guiding light from a light source to create visual effects forwards and backwards, thereby improving aesthetics. Particularly, the glass portion is provided with an anti-glare portion to make light diffuse by the light guide bar more visible, thereby improving aesthetics, and light emitted backwards can create a mood lamp with the help of a separate reflector.

In addition, according to embodiments of the present invention, it is possible to provide a display device which has a compact structure wherein an edge light unit is integrally provided inside the display device, and in which a light guide bar has an extension interposed between a rear cover and a glass portion, thereby improving assembly efficiency while securing rigid fixation.

BRIEF DESCRIPTION

DETAILED DESCRIPTION

Hereinafter, exemplary embodiments of a display device according to embodiments of the present invention will be described.

It should be noted that the drawings are not to precise scale and may be exaggerated in thickness of lines or size of components for descriptive convenience and clarity only. In addition, the terms used herein are defined by taking functions of embodiments of the present invention into account and can be changed according to user or operator custom or intention. Therefore, definition of the terms should be made according to the overall disclosure set forth herein.

Figure 1:
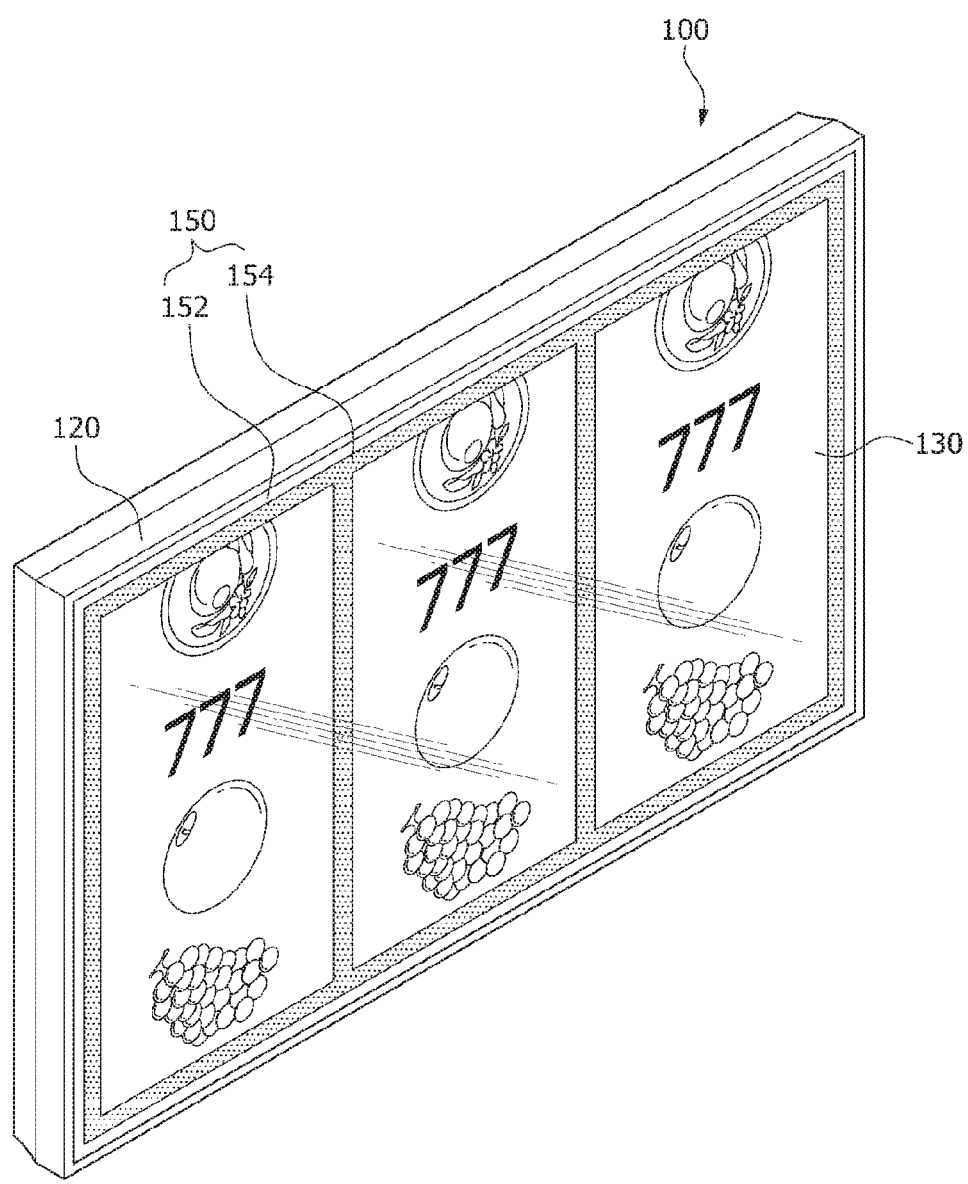
FIG. 1 is a perspective view of a display device according to one embodiment of the present invention.
Figure 2:
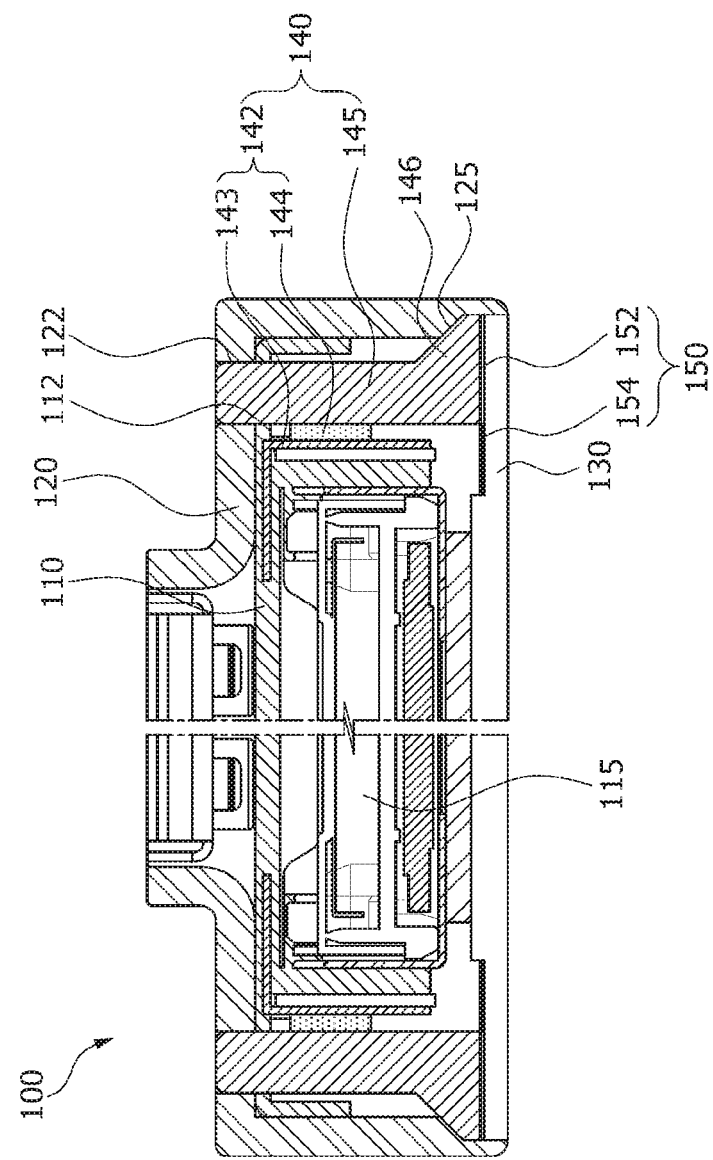
FIG. 2 is a sectional view of the display device according to the embodiment of the present invention.
Figure 3:
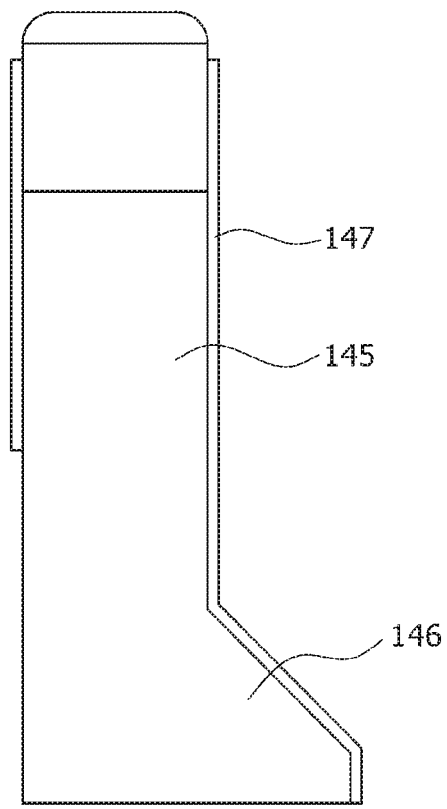
FIG. 3 is a view of a light guide bar of the display device according to the embodiment of the present invention.
Figure 4:
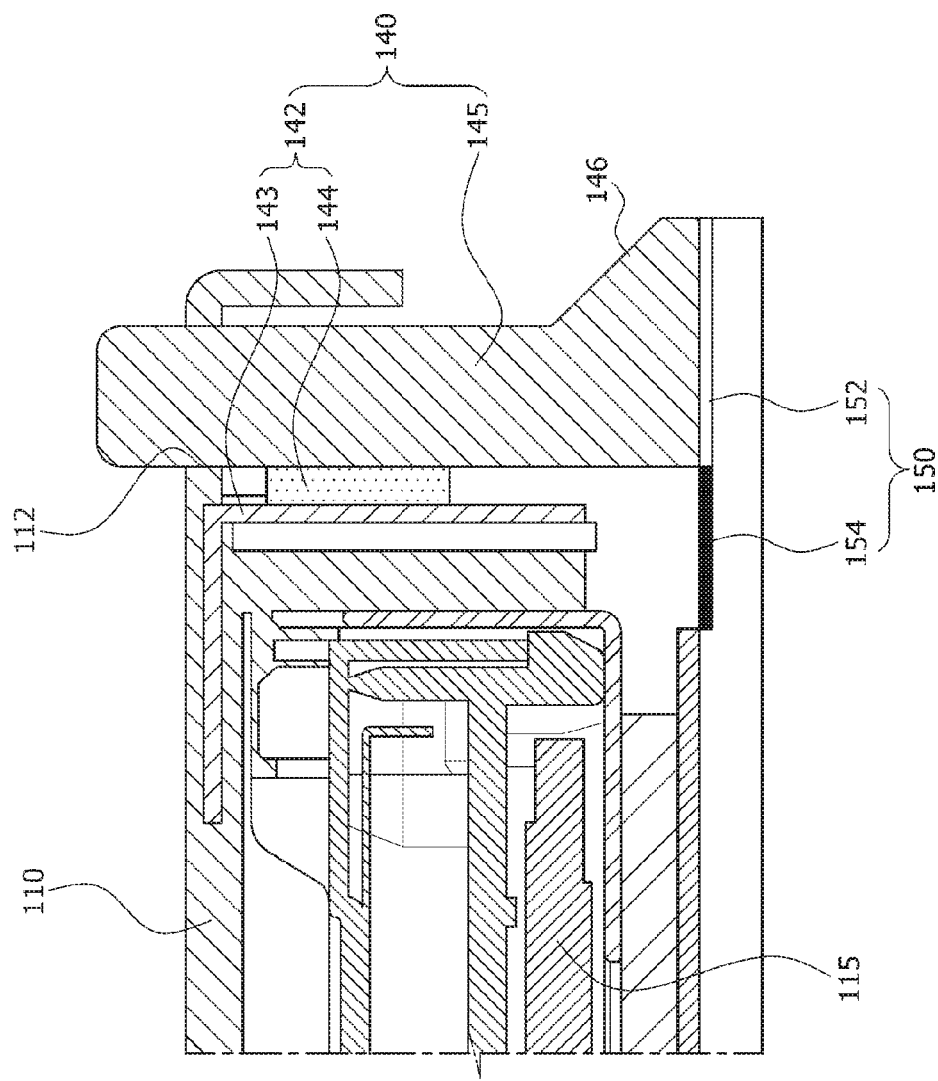
FIG. 4 is a sectional view of main portions of the display device according to the embodiment of the present invention.
Figure 5:
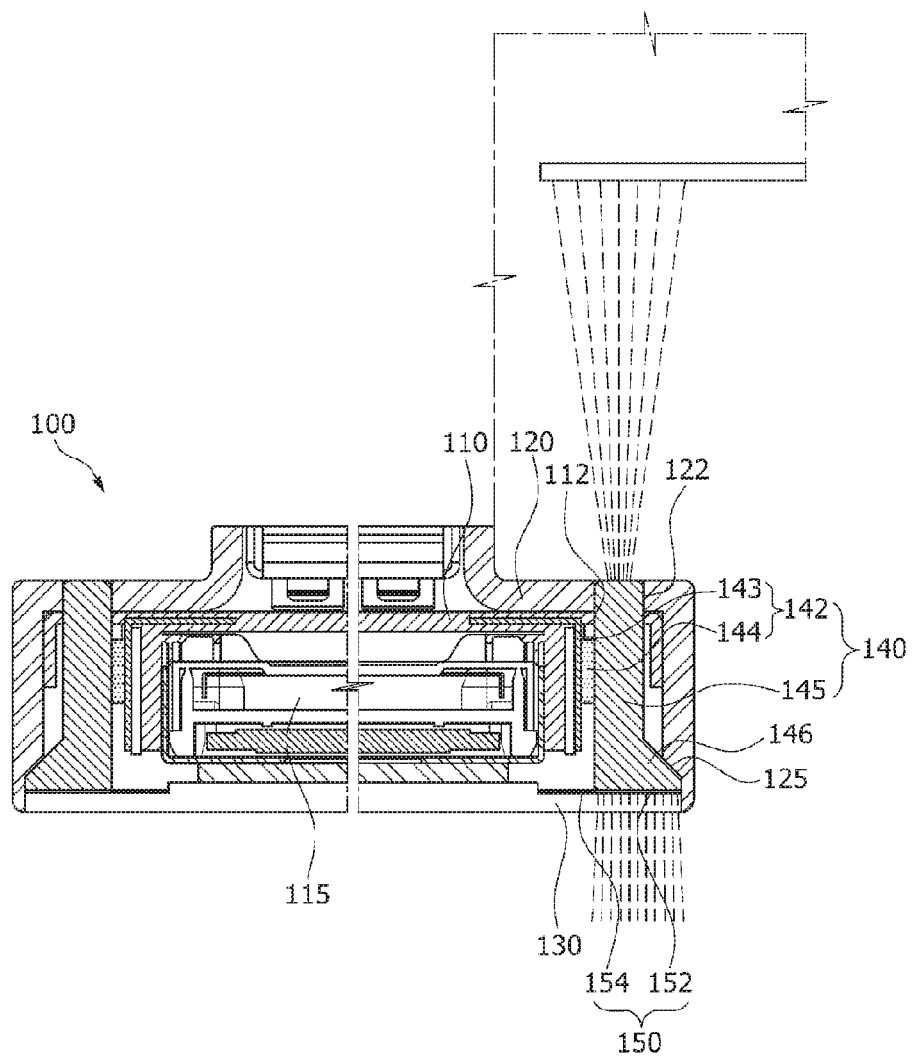
FIG. 5 is a sectional view illustrating use of the display device according to the embodiment of the present invention.

FIG. 1 is a perspective view of a display device according to one embodiment of the present invention; FIG. 2 is a sectional view of the display device according to the embodiment of the present invention; FIG. 3 is a view of a light guide bar of the display device according to the embodiment of the present invention; FIG. 4 is a section view of main portions of the display device according to the embodiment of the present invention; and FIG. 5 is a sectional view illustrating use of the display device according to the embodiment of the present invention.

Referring to FIGS. 1 to 5, a display device 100 according to one embodiment of the present invention includes a frame 110, a rear cover 120, a glass portion 130, and an edge light unit 140.

The frame 110, on which electronic components are mounted, has a 'U' shape open at an upper side thereof in cross-sectional view and is provided therein with a display panel 115. The display panel 115 may be composed of a liquid crystal display (LCD), a light emitting diode (LED) 144, a plasma display panel (PDP), an organic-LED (OLED) 144, and the like.

The rear cover 120 is provided to a rear side of the frame 110 to cover the rear surface. The glass portion 130 is provided to a front side of the frame 110 to cover the display panel 115 provided to the frame 110.

The edge light unit 140 is provided to the frame 110 to irradiate light forwardly and backwardly of an edge of the frame and includes a light source 142 disposed around the frame 110 and a light guide bar 145 diffusing and guiding light from the light source 142 to be directed forwards and backwards.

The light source 142 includes a plurality of LEDs 144 mounted on a flexible PCB 143. The flexible PCB 143 is provided to a lateral side of the frame 110 and bent to the rear side of the frame 110. Light emitted from the light source 142 is irradiated laterally of the frame 110. Light irradiated laterally of the frame 110 is guided to a front side of the glass portion 130 and to the backside of the rear cover 120 by the light guide bar 145.

The light guide bar 145 is formed in a hollow rectangular shape to surround a circumferential surface of the frame 110 and has a bar shape in cross-sectional view, as shown in FIG. 2 and FIG. 3. The light guide bar 145 adjoins an inner surface of the glass portion 130 at a leading end thereof and extends backwards to be exposed outwards at a rear end thereof. Specifically, the rear end of the light guide bar 145 passes through a though-hole 112 of the frame 110 and is exposed outwards through an open hole 122 of the rear cover 120.

The light guide bar 145 is formed of milky plastic to prevent hotspots of the light source 142.

In addition, the light guide bar 145 has an extension 146 so as to be interposed between the rear cover 120 and the glass portion 130. This feature facilitates assembly of the light guide bar 145, and the extension 146 extends to incline outwards from the leading end of the light guide bar 145 and is fixedly disposed between the rear cover 120 and the glass portion 130. Here, the rear cover 120 has a stepped portion 125 to allow the extension 146 to be interposed between the rear cover 120 and the glass portion 130. Since such a structure allows the leading end of the light guide bar 145 to be secured by the extension 146 interposed between the rear cover 120 and the glass portion 130 and allows the rear end thereof to be fixedly fitted into the open hole 122 of the rear cover 120, the light guide bar 145 can be secured inside the display device 100 without any separate coupling member.

As shown in FIG. 3, the light guide bar 145 is provided on a surface thereof with a white reflector 147 to precisely guide light from the light source 142 forwards and backwards without any loss.

The glass portion 130 is provided at an edge thereof with an anti-glare portion 150 which prevents glare of light emitted from the light guide bar 145.

The anti-glare portion 150 includes a white mask 152 disposed on the edge of the glass portion 130 to correspond to the leading end of the light guide bar 145 and a black mask 154 disposed on one or both sides of the white mask 152.

As shown in FIG. 4, although the black mask 154 is formed inside the white mask 152, it should be understood that the black mask 154 may be formed at each side of the white mask 152, or a plurality of white masks 152 and a plurality of black masks 154 may be arranged in stripes.

The white mask 152 and the black mask 154 are formed on an inner surface of the glass portion 130 by coating. The white mask 152 allows light guided by the light guide bar 145 to be irradiated outwards therethrough, and the black mask 154 serves to increase the contrast range of light.

Light irradiated backwardly of the light guide bar 145 can create mood lighting together with a reflector provided to a separate instrument or a wall, as shown in FIG. 5.

Next, effects of the display device 100 according to the embodiment of the present invention will be described.

The display device 100 according to the embodiment of the present invention may be used in a monitor for casinos and can irradiate light forwardly and backwardly of an edge thereof to create visual effects so as to attract user gaze.

First, in an assembly of the display device 100 according to the embodiment, the light source 142 is provided along the periphery of the lateral side of the frame 110. The light source 142 is composed of the flexible PCB 143 and the LED 144 and is secured to the lateral side of the frame 110, wherein the flexible PCB 143 is bent to be electrically connected to a controller (not shown). Such a structure can enhance utilization of a small space and provide a compact product.

Then, the light guide bar 145 is passed through the through-hole 112 of the frame 110, and the glass portion 130 is secured to the front side of the frame 110. Here, the leading end of the light guide bar 145 adjoins an inner surface of the edge of the glass portion 130. Then, the rear cover 120 is coupled to the rear side of the frame 110.

Here, the extension 146 extends from the leading end of the light guide bar 145 and is fixedly interposed between the glass portion 130 and the rear cover 120 to correspond to the stepped portion 125 of the rear cover 120. In other words, the light guide bar 145 is secured at the leading end thereof by the extension 146, and is fixedly supported at the rear end thereof by the through-hole 112 of the frame 110 and the open hole 122 of the rear cover 120, such that the light guide bar 145 can be secured without any separate coupling member.

As such, since the edge light unit 140 of the display device 100 for creating visual effects is not separately provided outside the glass portion 130 but integrally provided inside the display device 100, the display device 100 can have a compact structure while improving aesthetics.

As effects of the edge light unit 140, when the light source 142 is powered and emits light, light irradiated laterally of the frame 110 can be directed forwardly and backwardly of the display device 100 through the light guide bar 145. The light guide bar 145 is formed of milky plastic to diffuse and guide light forwards and backwards, thereby creating a soft glow while preventing hotspots of the light source 142 due to a small space.

Here, the light guide bar 145 is provided on a circumferential surface thereof with the white reflector 147, whereby light emitted from the light source 142 can be precisely guided forwards and backwards without any loss.

Light guided forwards through the light guide bar 145 can be more clearly irradiated forwards by the anti-glare portion 150, thereby improving aesthetics. The anti-glare portion 150 is composed of the white mask 152 and the black mask 154, thereby increasing the contrast range of light. In addition, light guided backwards is irradiated outwards through the rear end of the light guide bar 145 exposed through the open hole 122 to create a back light of the display device 100, thereby improving aesthetics.

Such back light may be utilized as a mood lamp by the help of a reflector provided to a separate instrument or a wall placed behind the display device 100.

As described above, according to the embodiment of the present invention, it is possible to provide a display device which includes a light guide bar integrally provided inside a glass portion and guiding light from a light source to create visual effects forwards and backwards, thereby improving aesthetics, and allows light irradiated laterally to be guided by the light guide bar, thereby having a compact structure.

Although some embodiments have been described herein, it should be understood by those skilled in the art that these embodiments are given by way of illustration only and the present invention is not limited thereto. In addition, it should be understood that various modifications, variations, and alterations can be made by those skilled in the art without departing from the spirit and scope of the present invention.

Therefore, the scope of the invention should be limited only by the accompanying claims and equivalents thereof.

The invention claimed is:

1. A display device comprising:
    a frame provided with a display panel;
    a rear cover covering a rear side of the frame;
    a glass portion covering a front side of the frame; and
    an edge light unit provided to the frame and irradiating light forwardly and backwardly of an edge of the frame, the edge light unit including a light source disposed around the frame and a light guide bar diffusing and guiding light from the light source to be irradiated forwardly and backwardly of the frame;
    wherein a rear end of the light guide bar projects through a through-hole of the frame, and the rear cover has an open hole through which the rear end of the light guide bar is exposed outwards.

2. The display device according to claim 1, wherein the glass portion is provided at an edge thereof with an anti-glare portion preventing glare of light irradiated through the light guide bar.

3. The display device according to claim 2, wherein the anti-glare portion further comprises:
    a white mask disposed on the edge of the glass portion to correspond to a leading end of the light guide bar; and
    a black mask disposed on one or both sides of the white mask.

4. The display device according to claim 1, wherein the light guide bar has an extension interposed between the rear cover and the glass portion to facilitate assembly with the rear cover and the glass portion.

5. The display device according to claim 1, wherein the light guide bar is provided on a surface thereof with a white reflector.

\* \* \* \* \*